(12) United States Patent
Kurapati et al.

(10) Patent No.: US 8,402,311 B2
(45) Date of Patent: Mar. 19, 2013

(54) MONITORING ACTIVITY WITH RESPECT TO A DISTRIBUTED APPLICATION

(75) Inventors: Venkata Seshu Kumar Kurapati, Bellevue, WA (US); Ilarie G. Letca, Redmond, WA (US); Ashvinkumar J. Sanghvi, Sammamish, WA (US); Dhananjay Madhusudan Mahajan, Sammamish, WA (US); Alexandre A. Coelho, Redmond, WA (US); Rajeev Sudhakar, Seattle, WA (US); Anandha Ganesan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 278 days.

(21) Appl. No.: 12/838,881

(22) Filed: Jul. 19, 2010

(65) Prior Publication Data

US 2012/0017120 A1  Jan. 19, 2012

(51) Int. Cl.
*G06F 11/00* (2006.01)
(52) U.S. Cl. ............ 714/25; 709/224; 714/4.1; 714/39; 714/48; 714/55
(58) Field of Classification Search .................. 709/224; 714/4.1, 25, 39, 48
See application file for complete search history.

(56) References Cited

U.S. PATENT DOCUMENTS

| | | |
|---|---|---|
| 6,714,976 B1 | 3/2004 | Wilson et al. |
| 6,760,903 B1 | 7/2004 | Morshed et al. |
| 6,765,863 B1 * | 7/2004 | Wakimoto et al. ............ 370/218 |
| 6,941,362 B2 * | 9/2005 | Barkai et al. .................. 709/223 |
| 7,165,097 B1 * | 1/2007 | Mackin et al. ................. 709/218 |
| 7,194,664 B1 * | 3/2007 | Fung et al. ...................... 714/45 |
| 7,249,195 B2 * | 7/2007 | Panec et al. .................... 709/238 |
| 7,284,162 B2 * | 10/2007 | Dragnea et al. ............... 714/47.2 |
| 7,401,141 B2 | 7/2008 | Carusi et al. |
| 7,424,530 B2 * | 9/2008 | Chagoly et al. ............... 709/224 |
| 7,487,407 B2 * | 2/2009 | Gehman et al. .................. 714/51 |
| 7,565,432 B2 * | 7/2009 | Huitema et al. ............... 709/226 |
| 7,711,987 B2 * | 5/2010 | Agarwal et al. ................. 714/26 |
| 7,725,777 B2 * | 5/2010 | Gehman et al. .................. 714/51 |
| 7,779,101 B1 * | 8/2010 | Zahavi et al. .................. 709/223 |
| 7,936,694 B2 * | 5/2011 | Choudhury .................... 370/252 |
| 7,992,033 B2 * | 8/2011 | Childress et al. ............... 714/4.1 |
| 8,099,488 B2 * | 1/2012 | Laye et al. ..................... 709/224 |
| 8,117,301 B2 * | 2/2012 | Kompella ...................... 709/224 |
| 8,204,986 B2 * | 6/2012 | Wexler et al. ................. 709/224 |
| 2001/0046206 A1 * | 11/2001 | Chan et al. .................... 370/222 |

(Continued)

OTHER PUBLICATIONS

Srivastava, et al., "Monitoring in .NET Distributed Application Design", Retrieved at <<http://msdn.microsoft.com/en-us/library/ee817668(printer).aspx>>, Aug. 2001, pp. 17.

(Continued)

*Primary Examiner* — Joshua P Lottich

(57) ABSTRACT

Techniques are described herein that are capable of monitoring activity with respect to a distributed application. A server system includes logical tiers, each including processing system(s) configured to process messages in accordance with a respective protocol (e.g., an ASP.net® protocol, WCF protocol, SQL protocol, etc.). When a user initiates an activity with respect to a distributed application, hops are performed between the logical tiers and/or between components of the distributed application to complete the requested activity. A hop is a transfer of a message or a procedure call from one processing system to another processing system. A common identifier may be assigned to each of the hops that are performed with regard to the activity. If a failure occurs with respect to the activity, the common identifier may be used to gather information regarding the hops. For instance, the information may be used to determine a source of the failure.

20 Claims, 10 Drawing Sheets

U.S. PATENT DOCUMENTS

| | | | |
|---|---|---|---|
| 2002/0129295 A1* | 9/2002 | Nishioka et al. | 714/4 |
| 2003/0023716 A1* | 1/2003 | Loyd | 709/224 |
| 2003/0051049 A1* | 3/2003 | Noy et al. | 709/238 |
| 2003/0065986 A1* | 4/2003 | Fraenkel et al. | 714/47 |
| 2003/0120771 A1* | 6/2003 | Laye et al. | 709/224 |
| 2004/0064725 A1* | 4/2004 | Padmanabhan et al. | 713/201 |
| 2005/0066026 A1* | 3/2005 | Chen et al. | 709/224 |
| 2006/0107086 A1* | 5/2006 | Walker et al. | 714/4 |
| 2006/0190594 A1* | 8/2006 | Jorgenson et al. | 709/224 |
| 2006/0212567 A1 | 9/2006 | Gulledge et al. | |
| 2007/0016831 A1* | 1/2007 | Gehman et al. | 714/43 |
| 2007/0204068 A1* | 8/2007 | Oku et al. | 709/251 |
| 2008/0114874 A1* | 5/2008 | Meir et al. | 709/224 |
| 2008/0222287 A1* | 9/2008 | Bahl et al. | 709/224 |
| 2008/0285560 A1* | 11/2008 | Curtis et al. | 370/392 |
| 2009/0031022 A1* | 1/2009 | Wexler et al. | 709/224 |
| 2009/0049429 A1 | 2/2009 | Greifeneder et al. | |
| 2009/0106361 A1* | 4/2009 | Gehman et al. | 709/203 |
| 2010/0156622 A1* | 6/2010 | Veres et al. | 340/506 |
| 2011/0099561 A1* | 4/2011 | Karakkattillathu Vishnu | 719/320 |

OTHER PUBLICATIONS

Park, et al., "Improve Debugging and Performance Tuning With ETW", Retrieved at <<http://msdn.microsoft.com/en-us/magazine/cc163437(printer).aspx>>, Apr. 2007, pp. 13.

"Guidelines for Application Integration", Retrieved at <<http://msdn.microsoft.com/en-us/library/ff647478(printer).aspx>>, Dec. 2003, pp. 20.

Roxburgh, Ulrich., "BizTalk Orchestration: Transactions, Exceptions, and Debugging", Retrieved at <<http://msdn.microsoft.com/en-us/library/ee265616(BTS.10,printer).aspx>>, Feb. 2001, pp. 20.

Johnson, Mark W., "Monitoring and Diagnosing Applications with ARM 4.0", Retrieved at <<http://www.opengroup.org/tech/management/arm/uploads/40/6357/ARM_4.0_paper.pdf>>, 30th International Computer Measurement Group Conference, Dec. 5-10, 2004, pp. 12.

* cited by examiner

MONITORING ACTIVITY WITH RESPECT TO A DISTRIBUTED APPLICATION

BACKGROUND

Many modern applications, such as line-of-business applications, are distributed. A distributed application is an application that is deployed with respect to multiple processing systems (e.g., computers). Accordingly, various components of a distributed application are deployed on respective processing systems. The processing systems collaborate to perform activities that are initiated by users. For example, a user may submit a request to sell a stock; another user may submit a request to watch a video; yet another user may submit a request to buy a book, and so on. The processing systems interact as needed to fulfill the requests of the users.

When a problem is detected with respect to a component of a distributed application, a source of the problem may not be the processing system on which that component is deployed. For instance, the source of the problem may be any processing system, database, network switch, etc. that was accessed for fulfilling requests of users.

Conventional techniques for determining a source of a problem with respect to a distributed application involve gathering information from all systems that are believed to have been accessed by the application. However, gathering the information from all such systems and analyzing the information may consume substantial time and/or resources. Moreover, conventional techniques often involve incorporating additional components into the distributed application for purposes of re-routing messages to a store from which the messages may be subsequently retrieved for analysis. The addition of such components often increases the overhead of the distributed application.

SUMMARY

Various approaches are described herein for, among other things, monitoring activity with respect to a distributed application. For example, a server system may include logical tiers. Each logical tier includes processing system(s) (e.g., one or more virtual or physical servers) that are configured to process messages (e.g., data packets) in accordance with a respective protocol. Examples of such protocols include but are not limited to an ASP.net® protocol, a Windows Communication Foundation (WCF) protocol, a structured query language (SQL) protocol, etc. When a user initiates an activity (e.g., selling a stock, watching a video, buying a book, etc.) with respect to a distributed application, hops are performed between the logical tiers and/or between components of the distributed application to complete the requested activity. A hop is a transfer of a message or a procedure call from one processing system to another processing system.

An example method is described in which a common identifier is assigned to each hop of a plurality of hops that are performed between logical tiers of a server system with regard to an activity of a user. A determination is made that a failure occurs with respect to the activity. Information regarding the plurality of hops is retrieved based on the common identifier to determine a source of the failure.

Another example method is described in which activities that occur with respect to a distributed application are assigned among activity types. Each activity includes hops that are performed between logical tiers of a server system. Each activity type corresponds to a respective subset of the activities. For each subset, a characteristic of the activities in that subset is determined. Each characteristic corresponds to a respective criterion regarding the distributed application. One or more of the characteristics is compared to respective threshold(s) to determine whether a failure occurs with respect to one or more of the respective criteria.

An example system is described that includes an assignment module, a failure module, and a retrieval module. The assignment module is configured to assign a common identifier to each hop of a plurality of hops that are performed between logical tiers of a server system with regard to an activity of a user. The failure module is configured to determine that a failure occurs with respect to the activity. The retrieval module is configured to retrieve information regarding the plurality of hops based on the common identifier to determine a source of the failure.

Another example system is described that includes an assignment module, a characteristic determination module, and a comparison module. The assignment module is configured to assign activities that occur with respect to a distributed application among activity types. Each activity includes hops that are performed between logical tiers of a server system. Each activity type corresponds to a respective subset of the activities. The characteristic determination module is configured to determine a characteristic of the activities in each subset. Each characteristic corresponds to a respective criterion regarding the distributed application. The comparison module is configured to compare one or more of the characteristics to respective threshold(s) to determine whether a failure occurs with respect to one or more of the respective criteria.

An example computer program product is described that includes a computer-readable medium having computer program logic recorded thereon for monitoring activity with respect to a distributed application. The computer program product includes first, second, and third program logic modules. The first program logic module is for enabling the processor-based system to assign a common identifier to each hop of a plurality of hops that are performed between logical tiers of a server system with regard to an activity of a user. The second program logic module is for enabling the processor-based system to determine that a failure occurs with respect to the activity. The third program logic module is for enabling the processor-based system to retrieve information regarding the plurality of hops based on the common identifier to determine a source of the failure.

Another example computer program product is described that includes a computer-readable medium having computer program logic recorded thereon for monitoring activity with respect to a distributed application. The computer program product includes first, second, and third program logic modules. The first program logic module is for enabling the processor-based system to assign activities that occur with respect to a distributed application among activity types. Each activity includes hops that are performed between logical tiers of a server system that may reside on the same or different physical systems. Each activity type corresponds to a respective subset of the activities. The second program logic module is for enabling the processor-based system to determine a characteristic of the activities in each subset. Each characteristic corresponds to a respective criterion regarding the distributed application. The third program logic module is for enabling the processor-based system to compare one or more of the characteristics to respective threshold(s) to determine whether a failure occurs with respect to one or more of the respective criteria.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIGS. 3, 4, 10, and 11 depict flowcharts of example methods for monitoring activity with respect to a distributed application in accordance with embodiments.

Figure 1:
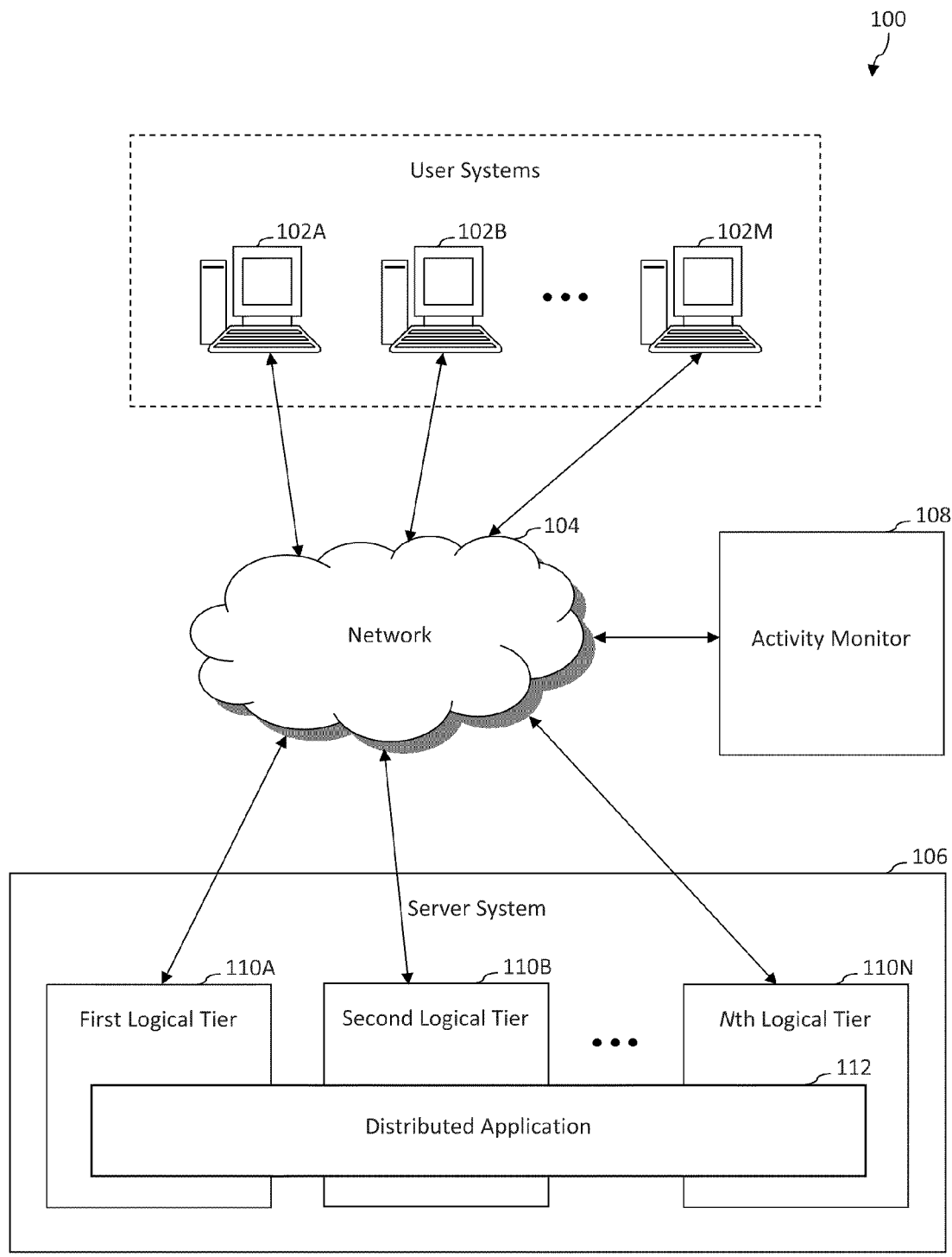
FIG. 1 is a block diagram of an example monitoring system in accordance with an embodiment.
Figure 5:
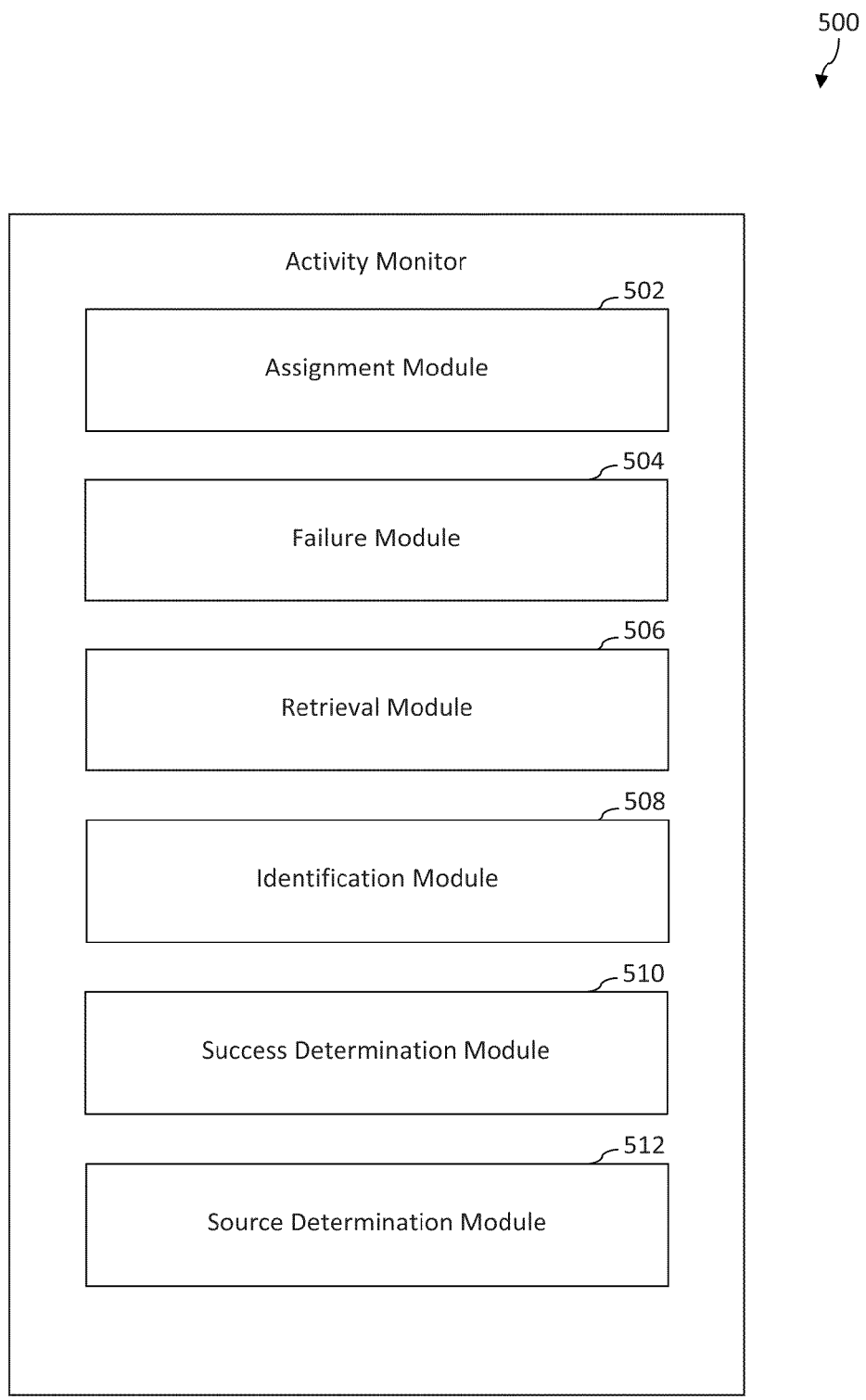
Figure 12:
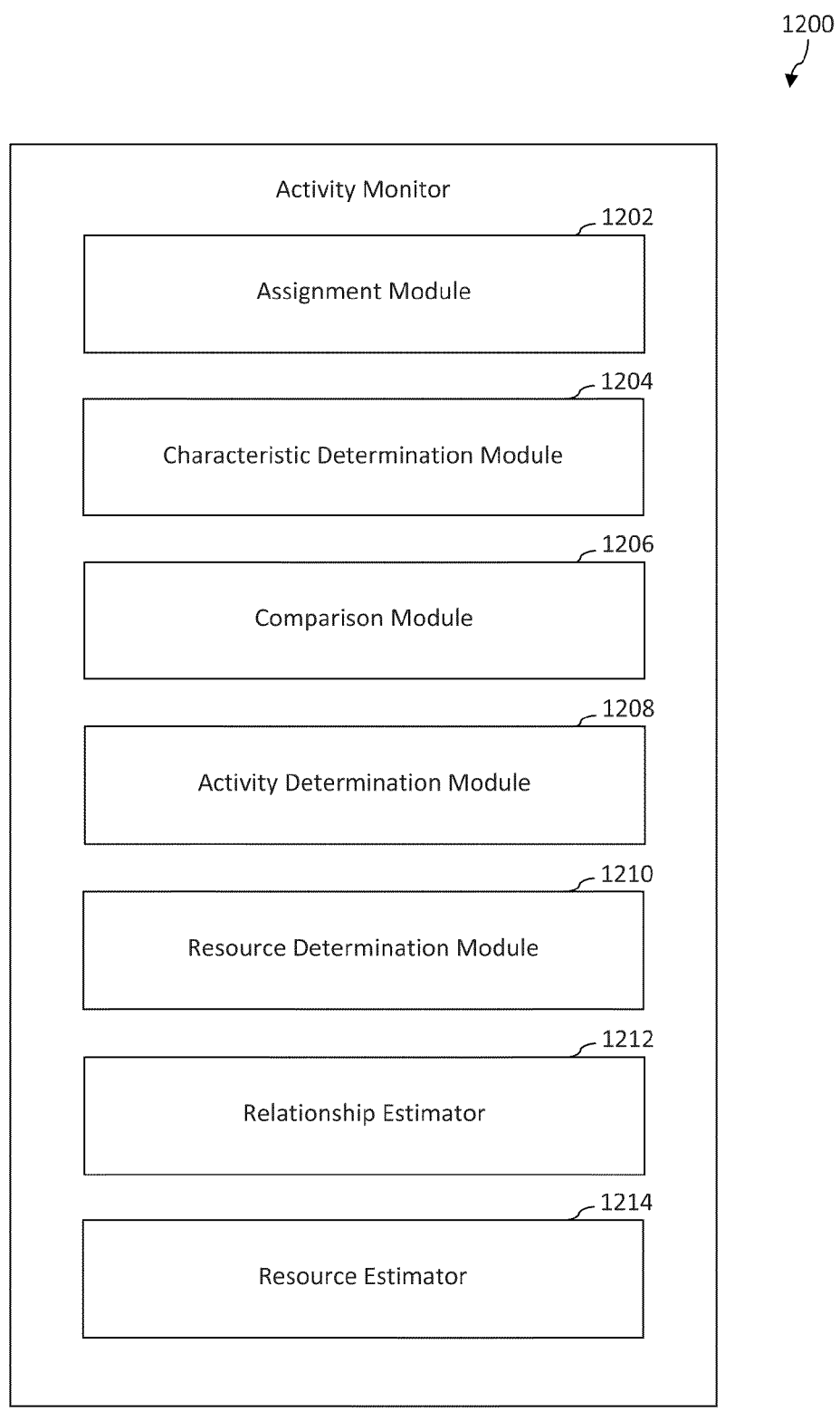

FIGS. 5 and 12 are block diagrams of example implementations of an activity monitor shown in FIG. 1 in accordance with embodiments.

Figure 6:
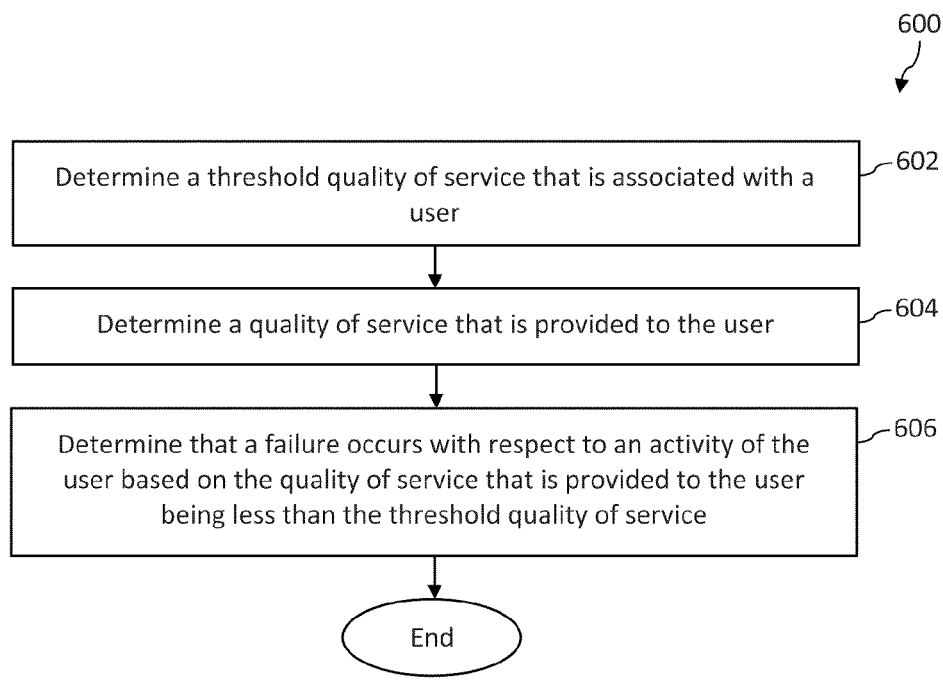

FIG. 6 depicts a flowchart of an example method for determining that a failure occurs with respect to an activity of a user in accordance with an embodiment.

Figure 7:
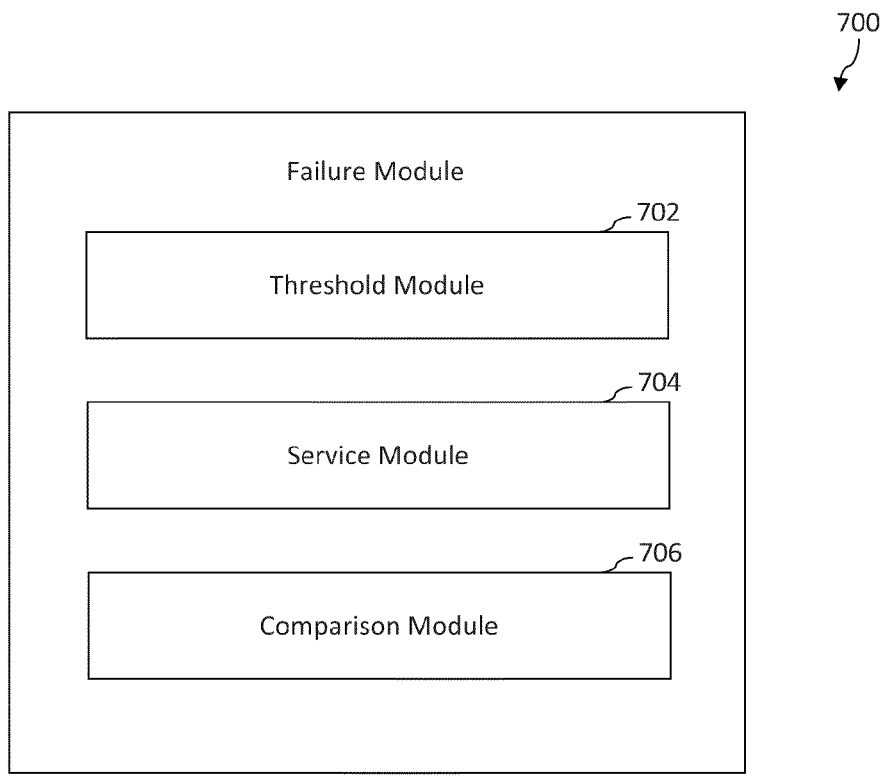

FIG. 7 is a block diagram of an example implementation of a failure module shown in FIG. 5 in accordance with an embodiment.

Figure 8:
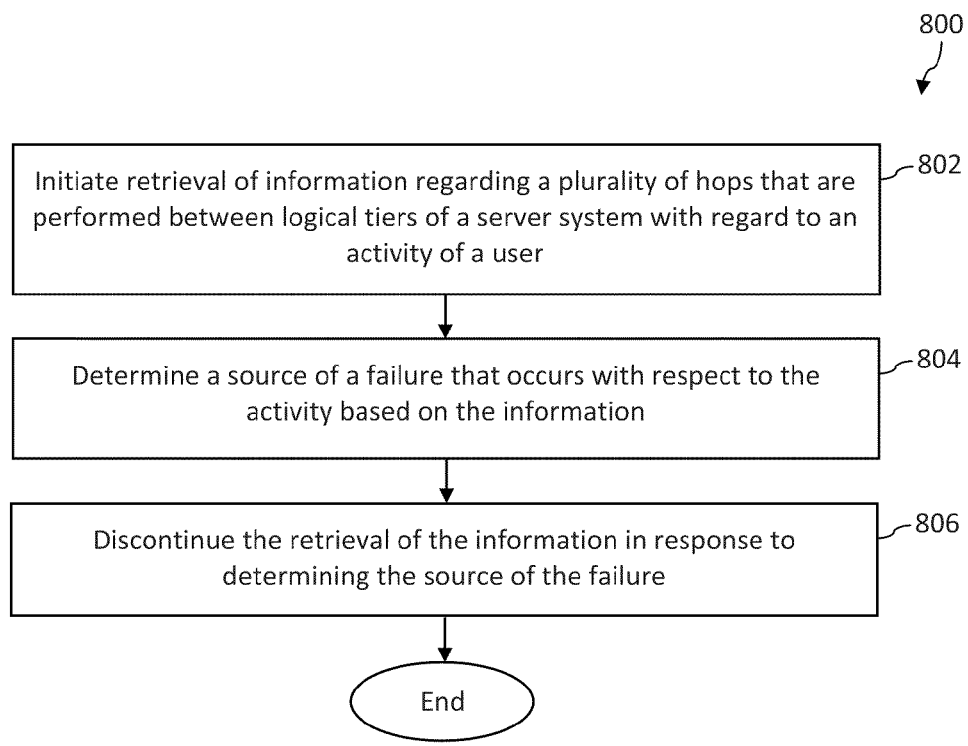

FIG. 8 depicts a flowchart of an example method for retrieving information in accordance with an embodiment.

Figure 9:
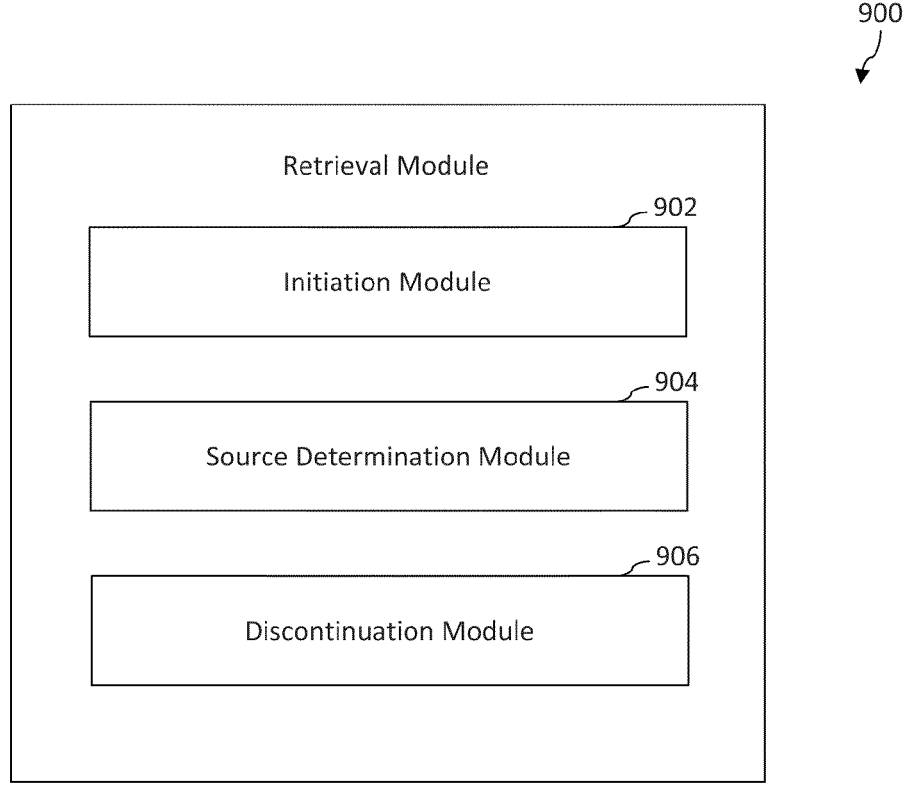

FIG. 9 is a block diagram of an example implementation of a retrieval module shown in FIG. 5 in accordance with an embodiment.

Figure 13:
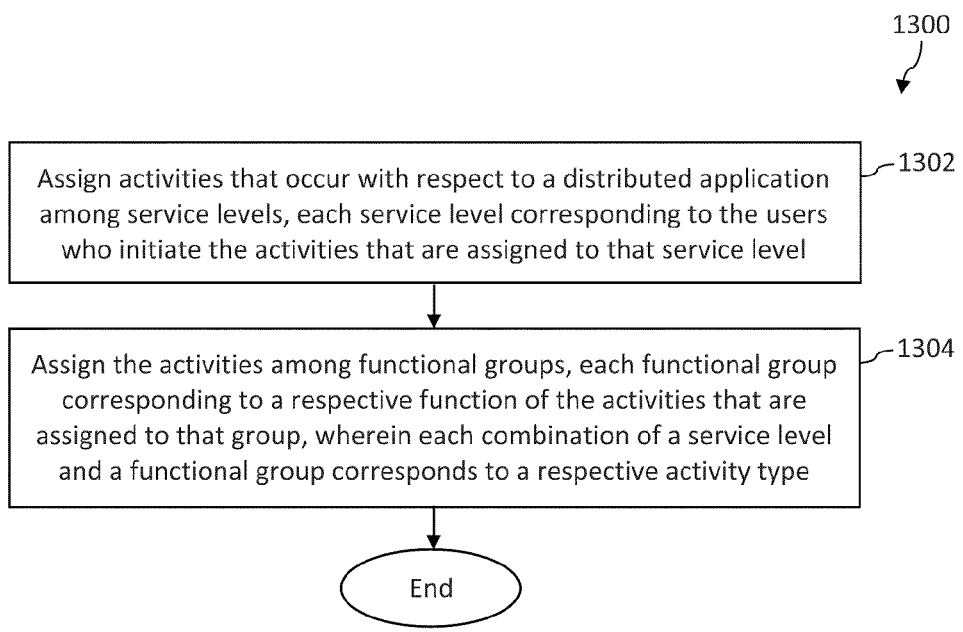

FIG. 13 depicts a flowchart of an example method for assigning activities among activity types in accordance with an embodiment.

Figure 14:
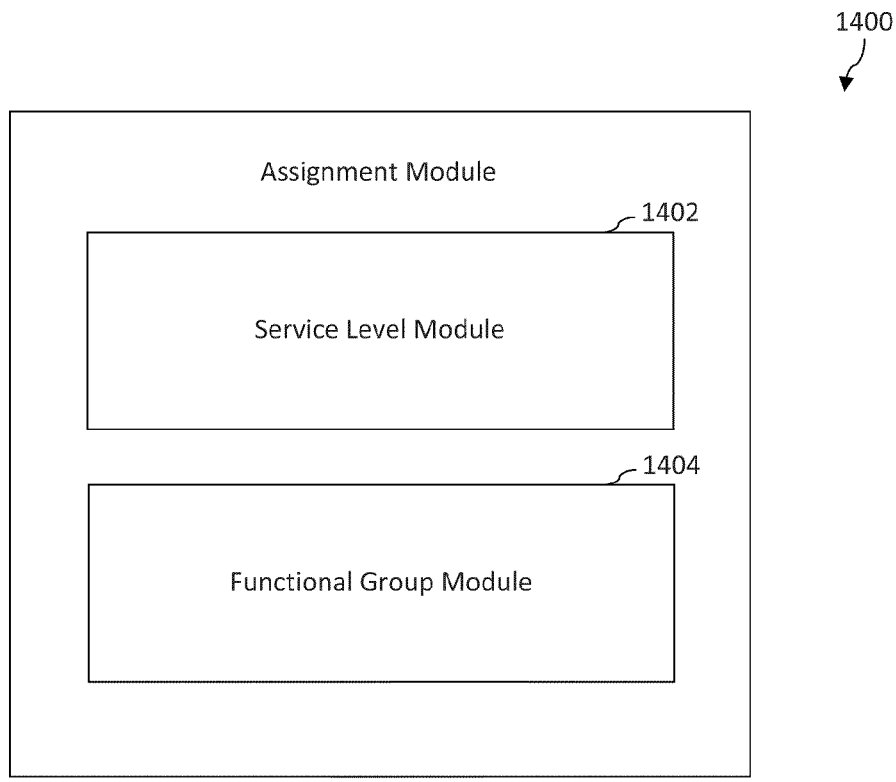

FIG. 14 is a block diagram of an example implementation of an assignment module shown in FIG. 12 in accordance with an embodiment.

Figure 15:
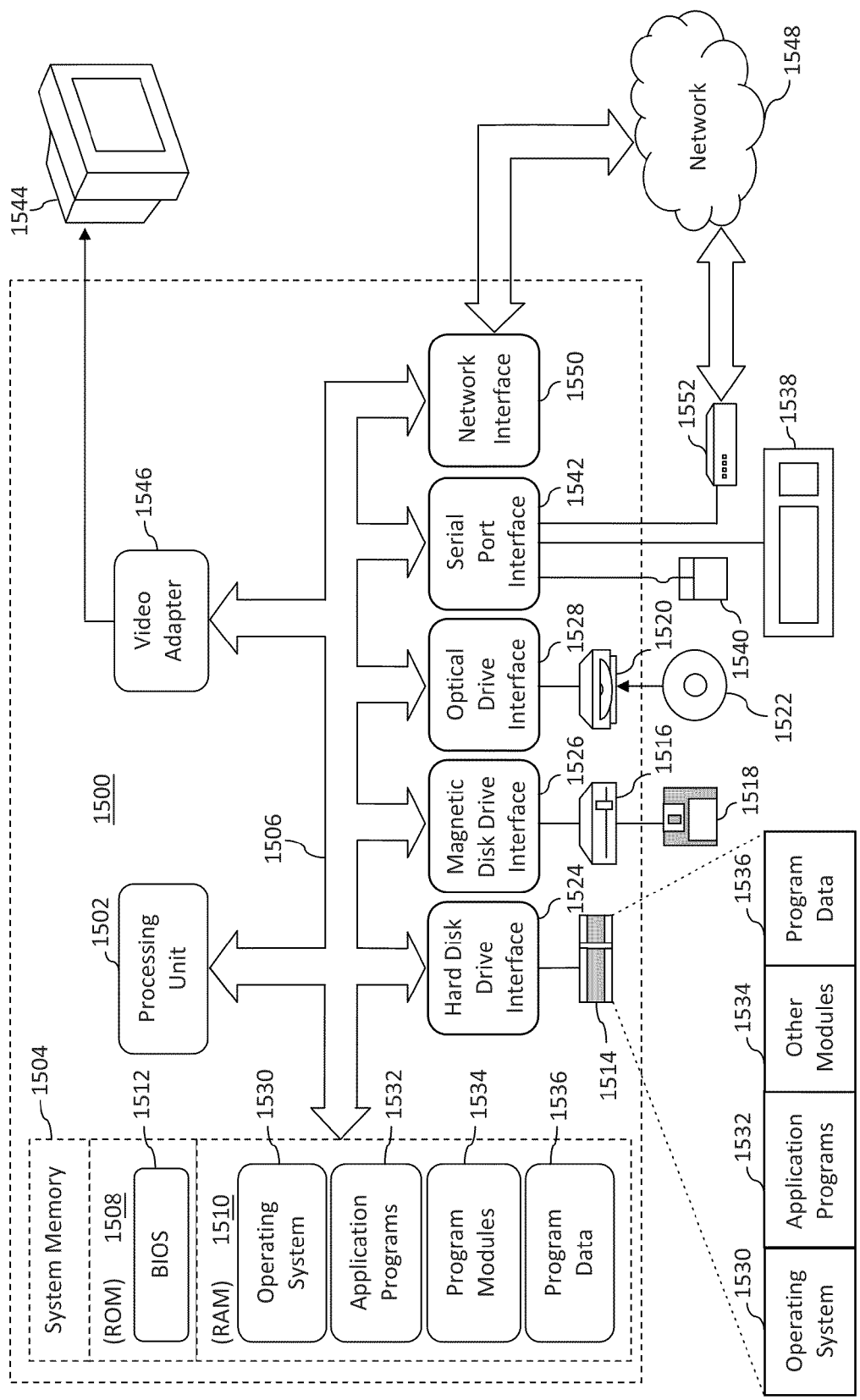

FIG. 15 depicts an example computer in which embodiments may be implemented.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of monitoring activity with respect to a distributed application. In accordance with example embodiments, a server system includes logical tiers. Each logical tier includes processing system(s) (e.g., one or more virtual or physical servers) that are configured to process messages (e.g., data packets) in accordance with a respective protocol (e.g., an ASP.net® protocol, a Windows Communication Foundation (WCF) protocol, a structured query language (SQL) protocol, etc.). When a user initiates an activity (e.g., selling a stock, watching a video, buying a book, etc.) with respect to a distributed application, hops are performed between the logical tiers and/or between components of the distributed application to complete the requested activity. A hop is a transfer of a message or a procedure call from one processing system to another processing system. For example, messages may be transferred between the logical tiers of the server system. In another example, procedure calls may be transferred between the components of the distributed application.

In some example embodiments, a common identifier is assigned to each of the hops that are performed with regard to an activity of a user. If a failure occurs with respect to the activity, the common identifier is used to gather information regarding the hops. For instance, the information may be used to determine a source of the failure.

In other example embodiments, activities that occur with respect to a distributed application are assigned among activity types. Each activity includes hops that are performed between logical tiers of a server system. Each activity type corresponds to a respective subset of the activities. For each subset, a characteristic of the activities in that subset is determined. Each characteristic corresponds to a respective criterion regarding the distributed application. One or more of the characteristics are compared to respective threshold(s) to determine whether a failure occurs with respect to one or more of the respective criteria.

Example techniques described herein have a variety of benefits as compared to conventional techniques for determining a source of a problem with respect to a distributed application. For instance, some example techniques are extensible. Such techniques are capable of accommodating (or are capable of being adapted to accommodate) previously unfamiliar protocols. Example techniques are capable of monitoring activities to determine compliance (or non-compliance) of a distributed application with a service level agreement (SLA) and/or an operation level agreement (OLA). Example techniques are capable of distinguishing between service levels that are associated with users. For instance, such techniques are capable of using different thresholds for activities that are initiated by users who have different service levels to determine whether a failure occurs with respect to those activities (or an activity type with which those activities correspond).

Example embodiments may consume less time and/or fewer resources than conventional techniques. It may not be necessary to incorporate additional components into a distributed application for purposes of re-routing messages to a store from which the messages may be subsequently retrieved for analysis. Example embodiments may be minimally invasive with regard to changes made to messages and/or operation calls. For instance, such changes may be made as a last resort and only if necessary. In some example embodiments, retrieval of information regarding hops is performed on an as-needed basis. The retrieval of such information may be performed with respect to only hops that are included in a failed activity and/or activity type. In accordance with some example embodiments, metrics are generated to provide information regarding characteristics of activities and/or activity types. A determination may be made as to whether a failure occurs with respect to such activities and/or activity types based on the metrics.

FIG. 1 is a block diagram of an example monitoring system 100 in accordance with an embodiment. Generally speaking, monitoring system 100 operates to monitor activity with respect to a distributed application. As shown in FIG. 1, monitoring system 100 includes a plurality of user systems 102A-102M, a network 104, a server system 106, and an activity monitor 108. Communication among user systems 102A-102M, server system 106, and activity monitor 108 is carried out over network 104 using well-known network communication protocols. Network 104 may be a wide-area network (e.g., the Internet), a local area network (LAN), another type of network, or a combination thereof.

User systems 102A-102M are processing systems that are capable of communicating with server system 106. An example of a processing system is a system that includes at least one processor that is capable of manipulating data in accordance with a set of instructions. For instance, a processing system may be a computer, a personal digital assistant, etc. User systems 102A-102M are configured to provide requests (e.g., HTTP requests) to server system 106 for the purpose of initiating respective activities. Examples of an activity include but are not limited to selling a stock, watching a video, buying a book, etc. For instance, a user may initiate a request using a client (e.g., a Web browser, Web crawler, non-Web-enabled client, etc.) deployed on a user system 102 that is owned by or otherwise accessible to the user for the purpose of initiating an activity.

In accordance with some example embodiments, user systems 102A-102M are capable of accessing Web sites hosted by server system 106, so that user systems 102A-102M may access information that is available via the Web sites. Such information may include documents (e.g., Web pages, images, video files, etc.), output of executables, or any other suitable type of information. The Web pages may be provided as hypertext markup language (HTML) documents and objects (e.g., files) that are linked therein, for example. In accordance with these embodiments, user systems 102A-102M may provide requests for initiating respective activities via the Web sites. The information that is available via the Web sites need not necessarily be stored on server system 106. For example, the information may be accessible via server system 106 but stored elsewhere (e.g., in a remote database or an external server).

Although user systems 102A-102M are depicted as desktop computers in FIG. 1, persons skilled in the relevant art(s) will appreciate that user systems 102A-102M may include any suitable system or device, including but not limited to a laptop computer, a tablet computer, a personal digital assistant, a cellular telephone, etc.

Server system 106 is a processing system that is capable of communicating with user systems 102A-102M. Server system 106 is configured to, complete activities that are initiated by user systems 102A-102M with respect to a distributed application 112. For instance, server system 106 may complete the activities in response to receiving user-initiated requests regarding the activities from user systems 102A-102M.

Server system 106 includes a plurality of logical tiers 110A-110N. Each of the logical tiers 110A-110N includes a processing system that is configured to process messages (e.g., data packets) in accordance with a respective protocol. Examples of such protocols include but are not limited to an ASP.net® protocol, a Windows Communication Foundation (WCF) protocol, a structured query language (SQL) protocol, etc. For instance, first logical tier 110A may be configured to process messages in accordance with an ASP.net® protocol; second logical tier 110B may be configured to process messages in accordance with a Windows Communication Foundation protocol, and so on.

Distributed application 112 is deployed with respect to logical tiers 110A-110N, such that a respective component of distributed application 112 is deployed on each of the logical tiers 110A-110N. Messages and procedure calls are transferred between logical tiers 110A-110N for purposes of completing respective aspects of the activities that are initiated by user systems 102A-102M. When a message or a procedure call is transferred from one processing system to another processing system (e.g., from one logical tier to another logical tier), a "hop" is said to occur. Information regarding hops may be analyzed to diagnose problems that occur with respect to distributed application 112, as described in further detail below with reference to activity monitor 108 and FIGS. 3-14.

Activity monitor 108 is a processing system that is capable of communicating with server system 106. Activity monitor 108 is configured to monitor activity with respect to distributed application 112. It will be recognized that activity monitor 108 may be configured to monitor activity with respect to any number of distributed applications. For example, activity monitor 108 is capable of tracing activities that are completed by logical tiers 110A-110N. In accordance with this example, activity monitor 108 may assign a common identifier to each hop that is performed with regard to an activity. If a failure is detected with respect to the activity, activity monitor 108 may use the common identifier to retrieve information regarding the hops. Activity monitor 108 may use the retrieved information to determine a source of the failure.

Activity monitor 108 is further capable of analyzing activities that are performed with respect to distributed application 112 by activity type. For example, first criteria may be applied to a first subset of the activities that corresponds to a first activity type; second criteria may be applied to a second subset of the activities that corresponds to a second activity type, and so on. In accordance with this example, activity monitor 108 may analyze information regarding the first subset of activities to determine whether the first criteria are satisfied. Activity monitor 108 may analyze information regarding the second subset of activities to determine whether the one second criteria are satisfied, and so on.

Activity monitor 108 may discover dependencies between hops that are performed with regard to an activity using any of a variety of techniques. Such techniques may depend on the protocols that are used to generate and/or process the messages that are transferred in accordance with the hops. For example, to identify the activity flowing over an ASP.net® logical tier (i.e., a logical tier that is configured to process messages in accordance with an ASP.net® protocol), an ASP.net® uniform resource identifier (URI), such as a uniform resource locator (URL) or a uniform resource name (URN), may be determined based on a request from a user. In accordance with this example, activity monitor 108 may incorporate the ASP.net® URI into a page load that is associated with the activity. Activity monitor 108 may retrieve a call stack that indicates the messages that are provided with respect to the activity and/or resource metrics that are associated with the activity.

In a second example, to identify the activity flowing from the ASP.net® logical tier through a web service logical tier (i.e., a logical tier that is configured to process messages in accordance with a web service protocol, such as a WCF protocol), activity monitor 108 may analyze frames of the call stack to identify called functions that may lead to a web service proxy client code. Activity monitor 108 may correlate the ASP.net® URI mentioned in the previous paragraph with the web service operations discovered via the ASP.net® or web service discovery. Activity monitor 108 may monitor such endpoints via a monitoring mechanism that is specific to the web service, for example.

In a third example, to identify the activity flowing from the web service logical tier to a SQL logical tier (i.e., a logical tier that is configured to process messages in accordance with a SQL protocol), activity monitor 108 may analyze the call stack and profile the web services aspect of the activity to identify messages that are provided to a specified (e.g., System.Data.SqlClient) namespace. It should be noted that initial web service messages need not necessarily contain information regarding an activity with which they started. For instance, the web service may be any suitable web-based and/or .NET-based service.

In a fourth example, to identify a message or a procedure call that is provided by an SQL client in the SQL logical tier, activity monitor 108 may use a profiler technology to modify an ADO.net stack main entry points (e.g., an Execute Query function).

In a fifth example, to correlate a message from an SQL client with SQL server activity, a SQL profiler may be used in conjunction with the SQL tracing mechanism to correlate the messages that are provided by SQL client to the SQL server. Activity monitor 108 may retrieve statistics about a specified SQL statement that is executed, CPU time, reads, writes, duration, start time, end time, or any other suitable characteristic.

Activity monitor 108 may monitor transactions through a distributed application (e.g., a line-of-business application) using a template that specifies monitoring criteria for each logical tier 110A-110N, such as the ASP.net/®, web services, and SQL logical tiers described above. From a performance monitoring perspective, activity monitor 108 may configure, set, change, and/or monitor a service level agreement (SLA) and aspects of defined activities. Activity monitor 108 may log information regarding activities that do not satisfy criteria that are specified by the SLA. From an exception monitoring perspective, activity monitor 108 may configure, set, change, and/or monitor exceptions that are propagated to users. Activity monitor 108 may trace failed activities and correlate messages at each logical tier.

Activity monitor 108 may analyze the dependencies between hops to identify activity flows and parameters associated with the activities. Activity monitor 108 may determine resource consumption (and associated costs) for a designated activity or activity type. Resource costs may be calculated in virtual terms and then translated via interpolation or extrapolation into corresponding CPU, storage, and/or network costs. For example, a number of messages that occur at a root operation (i.e., hop) of an activity may be determined at each of a plurality of time instances. For purposes of illustration, assume that the number of messages at each of the time instances is 100, 200, and 1000, respectively. The CPU, storage, and/or network utilization also may be determined at each of the time instances. This data may be used in a dynamic model to predict the CPU, storage, and/or network utilization or cost when a hypothetical number (e.g., 55, 300, 2000, etc.) of messages occurs at the root operation of the activity.

Figure 2:
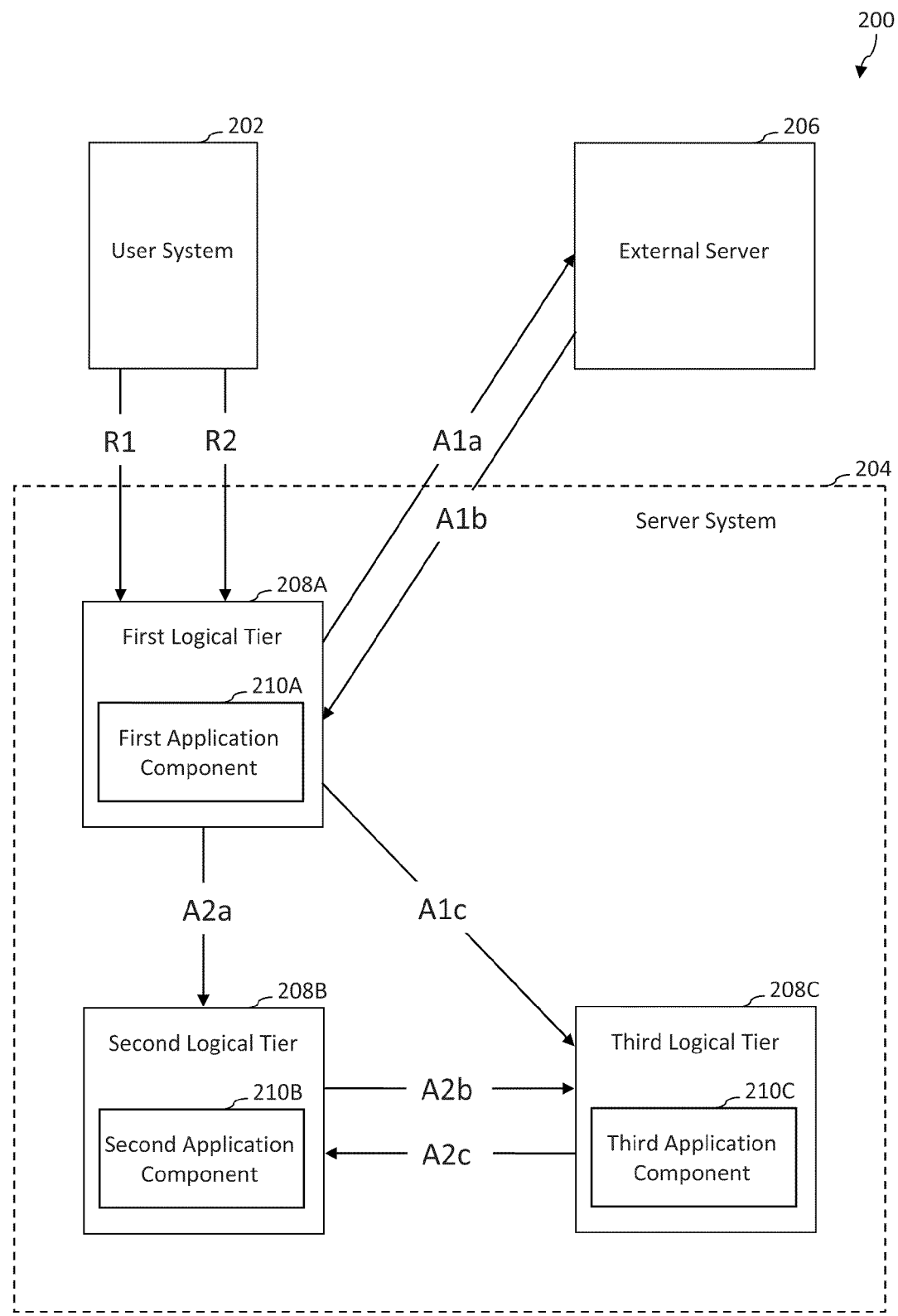
FIG. 2 is a block diagram of an example activity system in accordance with an embodiment.

FIG. 2 is a block diagram of an example activity system 200 in accordance with an embodiment. Generally speaking, activity system 200 operates to perform activities with respect to a distributed application that includes application components 210A-210C. As shown in FIG. 2, activity system 200 includes a user system 202, a server system 204, and an external server 206. Server system 204 includes a first logical tier 208A, a second logical tier 208B, and a third logical tier 208C. Application components 210A-210C are deployed on the respective logical tiers 208A-208C. External server 206 is a processing system that is not included in server system 204. External server 206 is capable of processing messages from logical tiers 208A-208C and providing messages to logical tiers 208A-208C for purposes of completing aspects of activities that are initiated by user system 202.

For purposes of illustration, first logical tier 208A is configured to process messages in accordance with an ASP.net® protocol; second logical tier 208B is configured to process messages in accordance with a Windows Communication Foundation (WCF) protocol; and third logical tier 208C is configured to process messages in accordance with a structured query language (SQL) protocol. For example, first logical tier 208A may host a Web site that enables users to initiate requests for performing activities (e.g., storing the users' credit card information, processing orders for products, etc.) with respect to the distributed application. Second logical tier 208B may process business logic for performing enterprise-level services (e.g., inventory tracking, shipping, etc.) with respect to the distributed application. Third logical tier 208C may manage data (e.g., users' credit card information, users' shipping addresses, etc.) with respect to the distributed application.

As shown in FIG. 2, user system 202 provides a first request R1 and a second request R2 to first logical tier 208A to initiate a first activity A1 and a second activity A2, respectively. For purposes of illustration, the first activity A1 represents storage of a user's credit card information, and the second activity A2 represents the user's purchase of a book. The flow of the first activity A1 will be described first, followed by a discussion of the flow of the second activity A2.

The first request R1 includes the user's credit card information. Upon receipt of the first request R1, first logical tier 208A sends a message to external server 206 in accordance with hop A1$a$ for authentication of the user's credit card information. External server 206 authenticates the user's credit card information and provides a message to first logical tier 208A in accordance with hop A1$b$ to indicate that the user's credit card information is authenticated. First logical tier 208A then forwards the user's credit card information to third logical tier 208C in accordance with hop A1$c$ for storage.

The second request R2 specifies a book that the user wishes to purchase. Upon receipt of the second request R2, first logical tier 208A sends a message to second logical tier 208B in accordance with hop A2a to specify the user and the book that the user wishes to purchase. Second logical tier 208B determines that the book is in inventory and sends a message to third logical tier 208C in accordance with hop A2b to request the shipping address and credit card information of the user. Third logical tier 208C retrieves the shipping address and credit card information of the user from a store (e.g., a relational database) and includes them in a message to second logical tier 208B in accordance with hop A2c. Second logical tier 208B then charges the user's credit card for the book and executes instructions for shipping the book to the user.

In an example embodiment, a first common identifier is assigned to hops A1a, A1b, and A1c. If a failure occurs with respect to the first activity A1, the first identifier may be used to gather information regarding hops A1a, A1b, and A1c to determine a source of the failure. In accordance with this example embodiment, a second common identifier is assigned to hops A2a, A2b, and A2c. If a failure occurs with respect to the second activity A2, the second identifier may be used to gather information regarding hops A2a, A2b, and A2c to determine a source of the failure. Common identifiers (e.g., the first and/or second common identifier(s)) may be used for any of a variety of other purposes to determine how the distributed application and/or activities that are performed with respect to the distributed application are behaving. Such other purposes include but are not limited to determining how many book orders have been received, how many book orders have processed successfully, how many book orders were not successfully completed, how many book orders have been suspended, etc. The activities described with respect to FIG. 2 are provided for illustrative purposes and are not intended to be limiting. The embodiments described herein are applicable to any suitable activity and/or type of activity.

Figure 3:
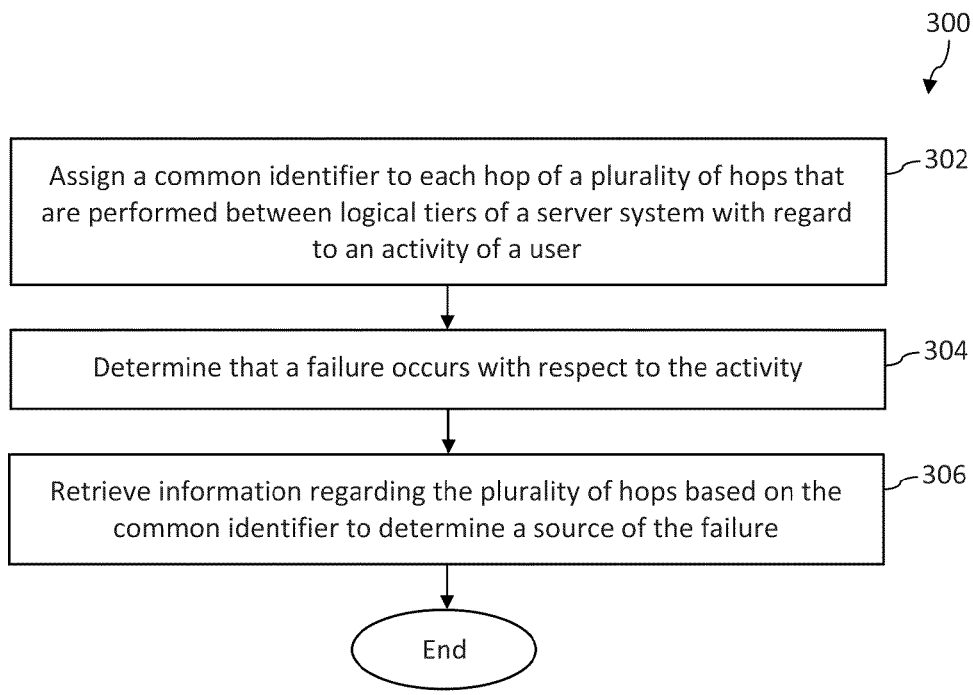
Figure 4:
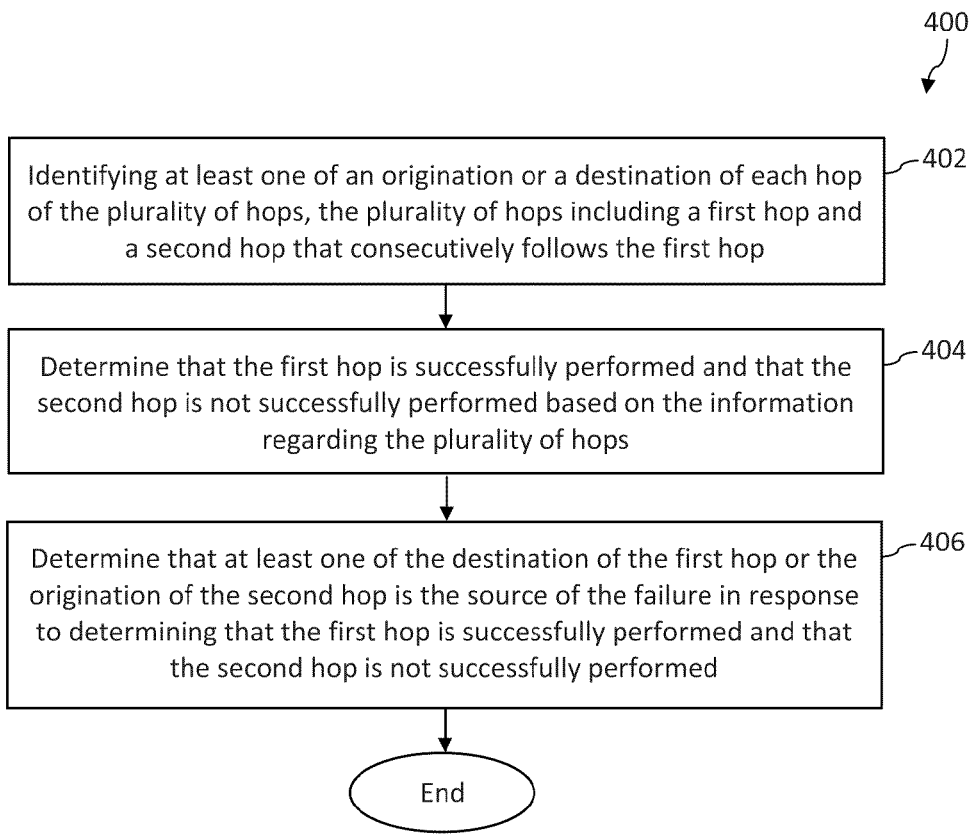

FIGS. 3 and 4 depict flowcharts 300 and 400 of example methods for monitoring activity with respect to a distributed application in accordance with embodiments. Flowcharts 300 and 400 are described from the perspective of an activity monitor. Flowcharts 300 and 400 may be performed by activity monitor 108 of monitoring system 100 shown in FIG. 1, for example. For illustrative purposes, flowcharts 300 and 400 are described with respect to an activity monitor 500 shown in FIG. 5, which is an example of an activity monitor 108, according to an embodiment. As shown in FIG. 5, activity monitor 500 includes an assignment module 502, a failure module 504, a retrieval module 506, an identification module 508, a success determination module 510, and a source determination module 512. Further structural and operational embodiments will be apparent to persons skilled in the relevant art(s) based on the discussion regarding flowcharts 300 and 400.

As shown in FIG. 3, the method of flowchart 300 begins at step 302. In step 302, a common identifier is assigned to each hop of a plurality of hops that are performed between logical tiers of a server system with regard to an activity of a user. In an example implementation, assignment module 502 assigns the common identifier to each hop of the plurality of hops.

At step 304, a determination is made that a failure occurs with respect to the activity. For example, the determination may be based on the activity not being completed. In another example, the determination may be based on a characteristic that is associated with the activity not satisfying one or more criteria. For instance, a criterion may specify a threshold amount of time within which the activity is to be completed. If the activity is not completed within the threshold amount of time, a failure may be deemed to have occurred. The example criterion mentioned above is provided for illustrative purposes and is not intended to be limiting. It will be recognized that a failure may be determined based on any suitable one or more criteria in accordance with this example. In an example implementation, failure module 504 determines that the failure occurs with respect to the activity.

At step 306, information regarding the plurality of hops is retrieved based on the common identifier to determine a source of the failure. For example, the information may include identifiers that indicate whether the respective hops were completed. In another example, the information may include characteristics (e.g., durations, start times, stop times, originations, destinations, etc.) of the respective hops. In an example implementation, retrieval module 506 retrieves the information regarding the plurality of hops.

Flowchart 300 need not necessarily end upon completion of step 306. For example, the steps of flowchart 400, which is shown in FIG. 4, may be incorporated into flowchart 300. As shown in FIG. 4, the method of flowchart 400 begins at step 402. In step 402, at least one of an origination or a destination of each hop of the plurality of hops is identified. The plurality of hops includes a first hop and a second hop that consecutively follows the first hop. In an example implementation, identification module 508 identifies at least one of the origination or the destination of each hop of the plurality of hops.

At step 404, a determination is made that the first hop is successfully performed and that the second hop is not successfully performed based on the information regarding the plurality of hops. In an example implementation, success determination module 510 determines that the first hop is successfully performed and that the second hop is not successfully performed based on the information regarding the plurality of hops.

At step 406, a determination is made that at least one of the destination of the first hop or the origination of the second hop is the source of the failure in response to determining that the first hop is successfully performed and that the second hop is not successfully performed. In an example implementation, source determination module 512 determines that at least one of the destination of the first hop or the origination of the second hop is the source of the failure.

It will be recognized that the steps of flowchart 400 may be performed independently from the steps of flowchart 300. It will be further recognized that activity monitor 500 may not include one or more of assignment module 502, failure module 504, retrieval module 506, identification module 508, success determination module 510, and/or source determination module 512. Furthermore, activity monitor 500 may include modules in addition to or in lieu of assignment module 502, failure module 504, retrieval module 506, identification module 508, success determination module 510, and/or source determination module 512.

FIG. 6 depicts a flowchart 600 of an example method for determining that a failure occurs with respect to an activity of a user in accordance with an embodiment. Flowchart 600 may be performed by failure module 504 of activity monitor 500 shown in FIG. 5, for example. For illustrative purposes, flowchart 600 is described with respect to a failure module 700 shown in FIG. 7, which is an example of a failure module 504, according to an embodiment. As shown in FIG. 7, failure module 700 includes a threshold module 702, a service module 704, and a comparison module 706. Further structural and operational embodiments will be apparent to persons skilled in the relevant art(s) based on the discussion regarding flowchart 600. Flowchart 600 is described as follows.

As shown in FIG. 6, the method of flowchart 600 begins at step 602. In step 602, a threshold quality of service that is associated with a user is determined. In an example implementation, threshold module 702 determines the threshold quality of service that is associated with the user.

In an example embodiment, the threshold quality of service is determined from among a plurality of threshold qualities of service. The plurality of threshold qualities of service is associated with a plurality of respective subsets of users. Each subset corresponds to a respective service level. For example, a first subset of the users may receive a "basic" level of service that corresponds to a first threshold quality of service. For purposes of illustration, the first threshold quality of service may indicate a minimum bandwidth of 12 megabits-per-second (MB/s) and a maximum time of 5 second for uploading documents. A second subset of the users may receive a "premium" level of service that corresponds to a second threshold quality of service. For purposes of illustration, the second threshold quality of service may indicate a minimum bandwidth of 60 MB/s and a maximum time of 2 second for uploading documents. In accordance with this example embodiment, threshold module 702 matches the user of step 602 with the threshold quality of service that corresponds to the level of service that the user receives.

In accordance with this example embodiment, the plurality of threshold qualities of service may be activity-specific or activity-agnostic. An activity-specific threshold quality of service is applicable to one or more designated activities. An activity-agnostic threshold quality of service is applicable to activities in general, rather than being applicable to any particular one or more activities.

At step 604, a quality of service that is provided to the user is determined. For example, the quality of service that is provided to the user may include a bandwidth that the user is experiencing, a time that it takes for documents of the user to be uploaded, etc. In an example implementation, service module 704 determines the quality of service that is provided to the user.

At step 606, a determination is made that a failure occurs with respect to an activity of the user based on the quality of service that is provided to the user being less than the threshold quality of service. For example, a bandwidth that the user is experiencing may be less than a minimum bandwidth indicated by the threshold quality of service. In another example, a time that it takes for documents of the user to be uploaded may be greater than a maximum time indicated by the threshold quality of service. In an example implementation, comparison module 706 determines that a failure occurs with respect to an activity of the user based on the quality of service that is provided to the user being less than the threshold quality of service.

FIG. 8 depicts a flowchart 800 of an example method for retrieving information in accordance with an embodiment. Flowchart 800 may be performed by retrieval module 506 of activity monitor 500 shown in FIG. 5, for example. For illustrative purposes, flowchart 800 is described with respect to a retrieval module 900 shown in FIG. 9, which is an example of a retrieval module 506, according to an embodiment. As shown in FIG. 9, retrieval module 900 includes an initiation module 902, a source determination module 904, and a discontinuation module 906. Further structural and operational embodiments will be apparent to persons skilled in the relevant art(s) based on the discussion regarding flowchart 800. Flowchart 800 is described as follows.

As shown in FIG. 8, the method of flowchart 800 begins at step 802. In step 802, retrieval of information is initiated. The information is regarding a plurality of hops that are performed between logical tiers of a server system with regard to an activity of a user. For instance, initiating the retrieval of the information may be performed in response to determining that the failure occurs, though the scope of the example embodiments is not limited in this respect. In an example implementation, initiation module 902 initiates the retrieval of the information.

At step 804, a source of a failure that occurs with respect to the activity is determined based on the information. In an example implementation, source determination module 904 determines the source of the failure based on the information.

At step 806, the retrieval of the information is discontinued in response to determining the source of the failure. In an example implementation, discontinuation module 906 discontinues the retrieval of the information.

Figure 10:
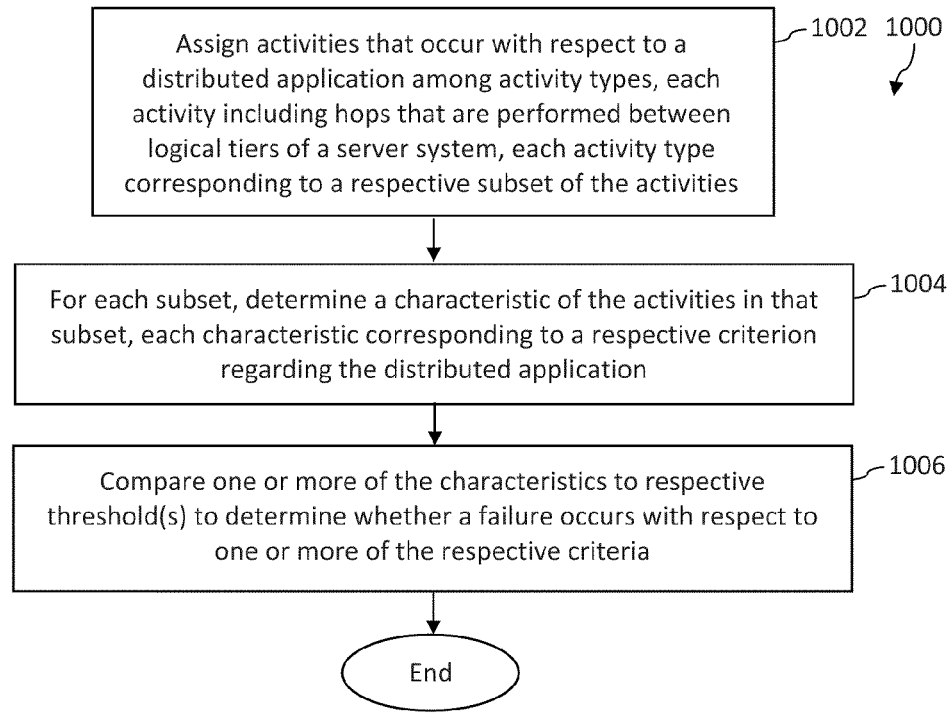
Figure 11:
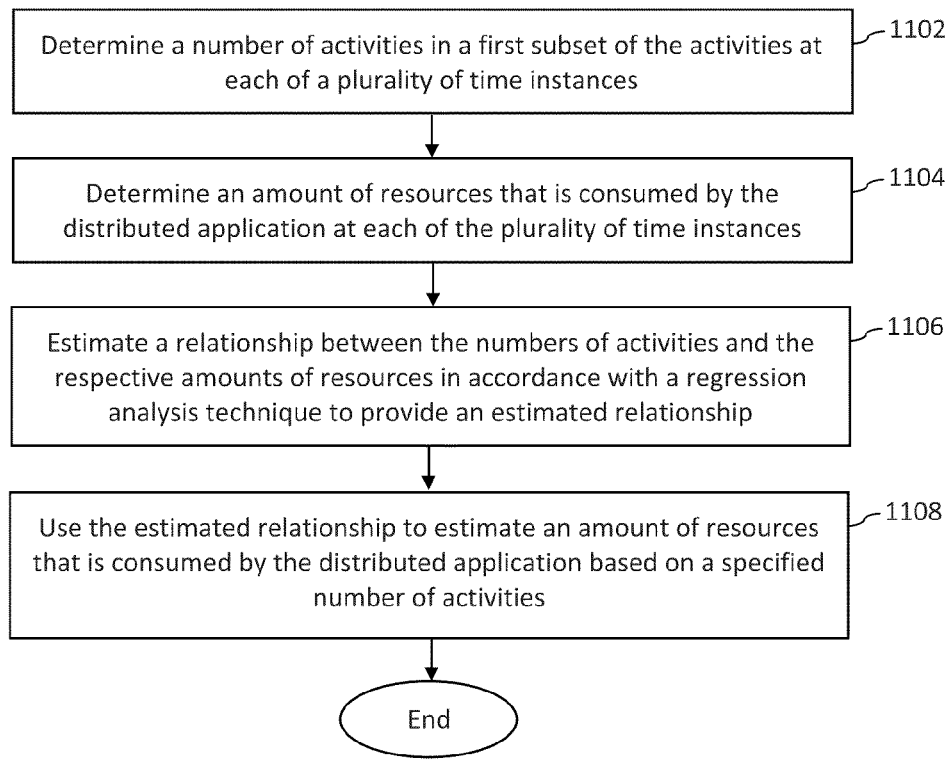

FIGS. 10 and 11 depict flowcharts 1000 and 1100 of example methods for monitoring activity with respect to a distributed application in accordance with embodiments. Flowcharts 1000 and 1100 are described from the perspective of an activity monitor. Flowcharts 1000 and 1100 may be performed by activity monitor 108 of monitoring system 100 shown in FIG. 1, for example. For illustrative purposes, flowcharts 1000 and 1100 are described with respect to an activity monitor 1200 shown in FIG. 12, which is an example of an activity monitor 108, according to an embodiment. As shown in FIG. 12, activity monitor 1200 includes an assignment module 1202, a characteristic determination module 1204, a comparison module 1206, an activity determination module 1208, a resource determination module 1210, a relationship estimator 1212, and a resource estimator 1214. Further structural and operational embodiments will be apparent to persons skilled in the relevant art(s) based on the discussion regarding flowcharts 1000 and 1100.

As shown in FIG. 10, the method of flowchart 1000 begins at step 1002. In step 1002, activities that occur with respect to a distributed application are assigned among activity types. Each activity includes hops that are performed between logical tiers of a server system. Each activity type corresponds to a respective subset of the activities. For example, a first activity type may correspond to a first subset of the activities that is directed to storing users' credit card information. A second activity type may correspond to a second subset of the activities that is directed to processing orders for books, and so on. In an example implementation, assignment module 1202 assigns the activities that occur with respect to the distributed application among the activity types.

At step 1004, for each subset, a characteristic of the activities in that subset is determined. Each characteristic corresponds to a respective criterion regarding the distributed application. Examples of a characteristic include but are not limited to a number (or proportion) of activities in a subset that are completed, not completed, suspended, etc.; an average rate at which activities in a subset are completed; an average number of hops that are performed with respect to activities in a subset, etc. The characteristics may be determined in absolute terms or with respect to a specified period of time. In an example implementation, characteristic determination module 1204 determines for each subset the characteristic of the activities in that subset.

At step 1006, one or more of the characteristics are compared to respective threshold(s) to determine whether a failure occurs with respect to one or more of the respective criteria. In an example implementation, comparison module 1206 compares one or more of the characteristics to respective threshold(s) to determine whether a failure occurs with respect to one or more of the respective criteria.

Flowchart 1000 need not necessarily end upon completion of step 1006. For example, the steps of flowchart 1100, which is shown in FIG. 11, may be incorporated into flowchart 1000. As shown in FIG. 11, the method of flowchart 1100 begins at step 1102. In step 1102, a number of activities in a first subset of the activities is determined at each of a plurality of time instances. In an example implementation, activity determination module 1208 determines the number of activities in the first subset of the activities at each of the plurality of time instances.

At step 1104, an amount of resources that is consumed by the distributed application is determined at each of the plurality of time instances. In an example implementation, resource determination module 1210 determines the amount of resources that is consumed by the distributed application at each of the plurality of time instances.

At step 1106, a relationship between the numbers of activities and the respective amounts of resources is estimated in accordance with a regression analysis technique to provide an estimated relationship. Examples of a regression analysis technique include but are not limited to a least squares fit technique, a Bayesian technique, a least absolute deviation technique; etc. In an example implementation, relationship estimator 1212 estimates the relationship between the number of activities and the respective amounts of resources in accordance with the regression analysis technique to provide the estimated relationship.

At step 1108, the estimated relationship is used to estimate an amount of resources that is consumed by the distributed application based on a specified number of activities. For instance, the estimated relationship may be used to perform an interpolation or an extrapolation to estimate the amount of resources that is consumed by the distributed application based on the specified number of activities. In an example implementation, resource estimator 1214 uses the estimated relationship to estimate the amount of resources that is consumed by the distributed application based on the specified number of activities.

It will be recognized that the steps of flowchart 1100 may be performed independently from the steps of flowchart 1000. It will be further recognized that activity monitor 1200 may not include one or more of assignment module 1202, characteristic determination module 1204, comparison module 1206, activity determination module 1208, resource determination module 1210, relationship estimator 1212, and/or resource estimator 1214. Furthermore, activity monitor 1200 may include modules in addition to or in lieu of assignment module 1202, characteristic determination module 1204, comparison module 1206, activity determination module 1208, resource determination module 1210, relationship estimator 1212, and/or resource estimator 1214.

FIG. 13 depicts a flowchart 1300 of an example method for assigning activities among activity types in accordance with an embodiment. Flowchart 1300 may be performed by assignment module 1202 of activity monitor 1200 shown in FIG. 12, for example. For illustrative purposes, flowchart 1300 is described with respect to an assignment module 1400 shown in FIG. 14, which is an example of an assignment module 1202, according to an embodiment. As shown in FIG. 14, assignment module 1400 includes a service level module 1402 and a functional group module 1404. Further structural and operational embodiments will be apparent to persons skilled in the relevant art(s) based on the discussion regarding flowchart 1300. Flowchart 1300 is described as follows.

As shown in FIG. 13, the method of flowchart 1300 begins at step 1302. In step 1302, activities that occur with respect to a distributed application are assigned among service levels. Each service level corresponds to the users who initiate the activities that are assigned to that service level. In an example implementation, service level module 1402 assigns the activities that occur with respect to the distributed application among the service levels.

At step 1304, the activities are assigned among functional groups. Each functional group corresponds to a respective function of the activities that are assigned to that group. For example, a first functional group may correspond to a first function of storing users' credit card information. A second functional group may correspond to a second function of processing orders for books, and so on. Each combination of a service level and a functional group corresponds to a respective activity type.

Assignment module 502, failure module 504, retrieval module 506, identification module 508, success determination module 510, source determination module 512, threshold module 702, service module 704, comparison module 706, initiation module 902, source determination module 904, discontinuation module 906, assignment module 1202, characteristic determination module 1204, comparison module 1206, activity determination module 1208, resource determination module 1210, relationship estimator 1212, resource estimator 1214, service level module 1402, and functional group module 1404 may be implemented in hardware, software, firmware, or any combination thereof.

For example, assignment module 502, failure module 504, retrieval module 506, identification module 508, success determination module 510, source determination module 512, threshold module 702, service module 704, comparison module 706, initiation module 902, source determination module 904, discontinuation module 906, assignment module 1202, characteristic determination module 1204, comparison module 1206, activity determination module 1208, resource determination module 1210, relationship estimator 1212, resource estimator 1214, service level module 1402, and/or functional group module 1404 may be implemented as computer program code configured to be executed in one or more processors.

In another example, assignment module 502, failure module 504, retrieval module 506, identification module 508, success determination module 510, source determination module 512, threshold module 702, service module 704, comparison module 706, initiation module 902, source determination module 904, discontinuation module 906, assignment module 1202, characteristic determination module 1204, comparison module 1206, activity determination module 1208, resource determination module 1210, relationship estimator 1212, resource estimator 1214, service level module 1402, and/or functional group module 1404 may be implemented as hardware logic/electrical circuitry.

FIG. 15 depicts an example computer 1500 in which embodiments may be implemented. Any one or more of the user systems 102A-102M, server system 106, any one or more of logical tiers 110A-110N, or activity monitor 108 shown in FIG. 1 (or any one or more subcomponents thereof shown in FIGS. 5, 7, 9, 12, and 14), or user system 202, server system 204, external server 206, or any one or more of logical tiers 208A-208C shown in FIG. 2 may be implemented using computer 1500, including one or more features of computer 1500 and/or alternative features. Computer 1500 may be a general-purpose computing device in the form of a conventional personal computer, a mobile computer, or a workstation, for example, or computer 1500 may be a special purpose computing device. The description of computer 1500 provided herein is provided for purposes of illustration, and is not intended to be limiting. Embodiments may be implemented in further types of computer systems, as would be known to persons skilled in the relevant art(s).

As shown in FIG. 15, computer 1500 includes a processing unit 1502, a system memory 1504, and a bus 1506 that couples various system components including system memory 1504 to processing unit 1502. Bus 1506 represents one or more of any of several types of bus structures, including a memory bus or memory controller, a peripheral bus, an accelerated graphics port, and a processor or local bus using any of a variety of bus architectures. System memory 1504 includes read only memory (ROM) 1508 and random access memory (RAM) 1510. A basic input/output system 1512 (BIOS) is stored in ROM 1508.

Computer 1500 also has one or more of the following drives: a hard disk drive 1514 for reading from and writing to a hard disk, a magnetic disk drive 1516 for reading from or writing to a removable magnetic disk 1518, and an optical disk drive 1520 for reading from or writing to a removable optical disk 1522 such as a CD ROM, DVD ROM, or other optical media. Hard disk drive 1514, magnetic disk drive 1516, and optical disk drive 1520 are connected to bus 1506 by a hard disk drive interface 1524, a magnetic disk drive interface 1526, and an optical drive interface 1528, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1530, one or more application programs 1532, other program modules 1534, and program data 1536. Application programs 1532 or program modules 1534 may include, for example, computer program logic for implementing assignment module 502, failure module 504, retrieval module 506, identification module 508, success determination module 510, source determination module 512, threshold module 702, service module 704, comparison module 706, initiation module 902, source determination module 904, discontinuation module 906, assignment module 1202, characteristic determination module 1204, comparison module 1206, activity determination module 1208, resource determination module 1210, relationship estimator 1212, resource estimator 1214, service level module 1402, functional group module 1404, flowchart 300 (including any step of flowchart 300), flowchart 400 (including any step of flowchart 400), flowchart 600 (including any step of flowchart 600), flowchart 800 (including any step of flowchart 800), flowchart 1000 (including any step of flowchart 1000), flowchart 1100 (including any step of flowchart 1100), and/or flowchart 1300 (including any step of flowchart 1300), as described herein.

A user may enter commands and information into the computer 1500 through input devices such as keyboard 1538 and pointing device 1540. Other input devices (not shown) may include a microphone, joystick, game pad, satellite dish, scanner, or the like. These and other input devices are often connected to the processing unit 1502 through a serial port interface 1542 that is coupled to bus 1506, but may be connected by other interfaces, such as a parallel port, game port, or a universal serial bus (USB).

A display device 1544 (e.g., a monitor) is also connected to bus 1506 via an interface, such as a video adapter 1546. In addition to display device 1544, computer 1500 may include other peripheral output devices (not shown) such as speakers and printers.

Computer 1500 is connected to a network 1548 (e.g., the Internet) through a network interface or adapter 1550, a modem 1552, or other means for establishing communications over the network. Modem 1552, which may be internal or external, is connected to bus 1506 via serial port interface 1542.

As used herein, the terms "computer program medium" and "computer-readable medium" are used to generally refer to media such as the hard disk associated with hard disk drive 1514, removable magnetic disk 1518, removable optical disk 1522, as well as other media such as flash memory cards, digital video disks, random access memories (RAMs), read only memories (ROM), and the like.

As noted above, computer programs and modules (including application programs 1532 and other program modules 1534) may be stored on the hard disk, magnetic disk, optical disk, ROM, or RAM. Such computer programs may also be received via network interface 1550 or serial port interface 1542. Such computer programs, when executed or loaded by an application, enable computer 1500 to implement features of embodiments discussed herein. Accordingly, such computer programs represent controllers of the computer 1500.

Example embodiments are also directed to computer program products comprising software (e.g., computer-readable instructions) stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

III. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described example embodiments, but should be defined only in accordance with the following claims and their equivalents.

What is claimed is:
1. A method comprising:
    assigning a common identifier to each hop of a plurality of hops that is performed between logical tiers of a server system with regard to an activity of a user;
    determining that a failure occurs with respect to the activity;
    retrieving information regarding the plurality of hops based on the common identifier to determine a source of the failure;
    identifying at least one of an origination or a destination of each hop of the plurality of hops, the plurality of hops including a first hop and a second hop that consecutively follows the first hop;

determining that the first hop is successfully performed and that the second hop is not successfully performed based on the information regarding the plurality of hops; and determining that at least one of a destination of the first hop or an origination of the second hop is the source of the failure in response to determining that the first hop is successfully performed and that the second hop is not successfully performed.

2. The method of claim 1, wherein determining that the failure occurs comprises:

determining a threshold quality of service that is associated with the user;

determining a quality of service that is provided to the user; and determining that the failure occurs based on the quality of service that is provided to the user being less than the threshold quality of service.

3. The method of claim 2, wherein determining the threshold quality of service that is associated with the user comprises:

determining the threshold quality of service from among a plurality of threshold qualities of service that are associated with a plurality of respective subsets of users, each subset corresponding to a respective service level.

4. The method of claim 1, wherein determining that the failure occurs with respect to the activity comprises:

determining that the failure occurs with respect to the activity based on the activity not being completed.

5. The method of claim 1, wherein retrieving the information comprises:

initiating retrieval of the information regarding the plurality of hops;

determining the source of the failure based on the information; and discontinuing the retrieval of the information in response to determining the source of the failure.

6. The method of claim 5, wherein initiating the retrieval of the information comprises:

initiating the retrieval of the information in response to determining that the failure occurs.

7. The method of claim 1, wherein assigning the common identifier to each hop of the plurality of hops comprises:

assigning the common identifier to a hop that is performed with regard to a previously unfamiliar logical tier of the server system.

8. A system comprising:

an assignment module configured to assign a common identifier to each hop of a plurality of hops that is performed between logical tiers of a server system with regard to an activity of a user;

a failure module, implemented using at least one processor, configured to determine that a failure occurs with respect to the activity;

a retrieval module configured to retrieve information regarding the plurality of hops based on the common identifier to determine a source of the failure;

an identification module configured to identify at least one of an origination or a destination of each hop of the plurality of hops, the plurality of hops including a first hop and a second hop that consecutively follows the first hop;

a success determination module configured to determine that the first hop is successfully performed and that the second hop is not successfully performed based on the information regarding the plurality of hops; and a source determination module configured to determine that at least one of a destination of the first hop or an origination of the second hop is the source of the failure in response to a determination that the first hop is successfully performed and that the second hop is not successfully performed.

9. The system of claim 8, wherein the failure module comprises:

a threshold module configured to determine a threshold quality of service that is associated with the user;

a service module configured to determine a quality of service that is provided to the user; and a comparison module configured to determine that the failure occurs based on the quality of service that is provided to the user being less than the threshold quality of service.

10. The system of claim 9, wherein the threshold module is configured to determine the threshold quality of service from among a plurality of threshold qualities of service that are associated with a plurality of respective subsets of users, each subset corresponding to a respective service level.

11. The system of claim 8, wherein the failure module is configured to determine that the failure occurs with respect to the activity based on the activity not being completed.

12. The system of claim 8, wherein the retrieval module comprises:

an initiation module configured to initiate retrieval of the information regarding the plurality of hops;

a source determination module configured to determine the source of the failure based on the information; and a discontinuation module configured to discontinue the retrieval of the information in response to determination of the source of the failure.

13. The system of claim 8, wherein the assignment module is adaptable to assign the common identifier to a hop that is performed with regard to a previously unfamiliar logical tier of the server system.

14. A method comprising:

assigning a plurality of activities that occur with respect to a distributed application among a plurality of activity types, each activity including a plurality of hops that are performed between logical tiers of a server system, each activity type corresponding to a respective subset of the plurality of activities;

for each subset, determining a characteristic of the activities in that subset, each characteristic corresponding to a respective criterion regarding the distributed application; and comparing one or more of the characteristics that correspond to the respective subsets to one or more respective thresholds to determine whether a failure occurs with respect to one or more of the respective criteria.

15. The method of claim 14, wherein assigning the plurality of activities among the plurality of activity types comprises:

assigning the plurality of activities that occur with respect to the distributed application among a plurality of service levels, each service level corresponding to the users who initiate the activities that are assigned to that service level; and assigning the plurality of activities among a plurality of functional groups, each functional group corresponding to a respective function of the activities that are assigned to that group; and wherein each combination of a service level and a functional group corresponds to a respective activity type.

16. The method of claim 14, wherein comparing one or more of the characteristics to the one or more respective thresholds comprises:

comparing a first characteristic of the activities in a first subset that corresponds to a first criterion to a first threshold to determine that a failure occurs with respect to the first criterion; and wherein the method further comprises:

for each activity, assigning a common identifier to each hop in the plurality of hops that are included in that activity; and retrieving information regarding the pluralities of hops that are included in the respective activities of the first subset based on the common identifiers that correspond to the respective activities to determine a source of the failure.

17. The method of claim 16, further comprising:

identifying at least one of an origination or a destination of each hop of a first plurality of hops that is included in a first activity in the first subset, the first plurality of hops including a first hop and a second hop that consecutively follows the first hop;

determining that the first hop is successfully performed and that the second hop is not successfully performed based on the information regarding the pluralities of hops; and determining that at least one of a destination of the first hop or an origination of the second hop is the source of the failure in response to determining that the first hop is successfully performed and that the second hop is not successfully performed.

18. The method of claim 14, wherein for each subset, determining the characteristic of the activities in that subset comprises:

for each subset, determining information regarding messages that are provided with respect to each activity in that subset, the information regarding the messages that are provided with respect to each activity corresponding to at least one of a processor utilization, a storage utilization, or a network utilization for that activity; and wherein comparing the one or more of the characteristics that correspond to the respective subsets to the one or more respective thresholds comprises:

comparing the information regarding the messages that are provided with respect to at least a first activity in a first subset to at least one respective threshold to determine whether the failure occurs with respect to the at least one of the processor utilization, the storage utilization, or the network utilization for the first activity.

19. The method of claim 14, wherein for each subset, determining the characteristic of the activities in that subset comprises:

for each subset, determining information regarding messages that are provided with respect to the activities in that subset, the information regarding the messages that are provided with respect to the activities corresponding to at least one of a processor utilization, a storage utilization, or a network utilization for that subset; and wherein comparing the one or more of the characteristics that correspond to the respective subsets to the one or more respective thresholds comprises:

comparing the information regarding the messages that are provided with respect to the activities in a first subset to at least one respective threshold to determine whether the failure occurs with respect to the at least one of the processor utilization, the storage utilization, or the network utilization for the first subset.

20. The method of claim 14, further comprising:

determining a number of activities in a first subset of the plurality of activities at each of a plurality of time instances;

determining an amount of resources that is consumed by the distributed application at each of the plurality of time instances;

estimating a relationship between the numbers of activities and the respective amounts of resources in accordance with a regression analysis technique to provide an estimated relationship; and using the estimated relationship to estimate an amount of resources that is consumed by the distributed application based on a specified number of activities.

* * * * *